US012679653B2

(12) United States Patent
Moriya et al.

(10) Patent No.: US 12,679,653 B2
(45) Date of Patent: Jul. 14, 2026

(54) PICKING SYSTEM

(71) Applicant: Hitachi, Ltd., Tokyo (JP)

(72) Inventors: Toshio Moriya, Tokyo (JP); Nobutaka Kimura, Tokyo (JP); Fumiko Beniyama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 418 days.

(21) Appl. No.: 18/275,570

(22) PCT Filed: Jan. 21, 2022

(86) PCT No.: PCT/JP2022/002187
§ 371 (c)(1),
(2) Date: Aug. 2, 2023

(87) PCT Pub. No.: WO2022/172727
PCT Pub. Date: Aug. 18, 2022

(65) Prior Publication Data
US 2024/0034563 A1      Feb. 1, 2024

(30) Foreign Application Priority Data

Feb. 15, 2021    (JP) ................................. 2021-021427

(51) Int. Cl.
*B65G 37/02*      (2006.01)
*B65G 1/137*      (2006.01)
(52) U.S. Cl.
CPC ........... *B65G 1/1378* (2013.01); *B65G 37/02* (2013.01)
(58) Field of Classification Search
CPC .............................. B65G 1/1378; B65G 37/02
See application file for complete search history.

(56) References Cited

U.S. PATENT DOCUMENTS

2006/0080827 A1      4/2006  Saito et al.

FOREIGN PATENT DOCUMENTS

JP          H11255328  A  *  9/1999
JP          4283804  B2     6/2009
(Continued)

OTHER PUBLICATIONS

International Search Report of PCT/JP2022/002187 dated Mar. 29, 2022.

*Primary Examiner* — Rodney A Butler
(74) *Attorney, Agent, or Firm* — MATTINGLY & MALUR, PC

(57) ABSTRACT

A picking system has a plurality of transport modules having a transport means for transporting goods and includes a plurality of transport lines comprising at least one of the transport modules. The transport lines include a first transport line for transporting goods along a transport route, a second transport line for temporarily storing the goods, and a third transport line for transporting shipping containers of the goods along the transport route. A transport module for picks takes out the goods transported from the first transport line. The transport module for picks can perform a first operation for accommodating the goods transported from the first transport line in the shipping containers, a second operation for placing the goods transported from the first transport line onto the second transport line, and a third operation for taking out the goods from the second transport line and accommodating the goods in the shipping containers.

8 Claims, 10 Drawing Sheets

(56) References Cited

FOREIGN PATENT DOCUMENTS

| | | | |
|---|---|---|---|
| JP | 2015-016914 | A | 1/2015 |
| JP | 6332143 | B2 * | 5/2018 |
| JP | 6696413 | B2 | 5/2020 |
| JP | 2020-172402 | A | 10/2020 |
| WO | 2017/110509 | A1 | 6/2017 |

* cited by examiner

| TYPE | SHAPE | CONVEYANCE CONTROL | ID RANGE |
|---|---|---|---|
| SHORT STRAIGHT CONVEYOR | VERTICAL: a, HORIZONTAL: b, HEIGHT: c, | A→B, B→A | 10001-10020 |
| LONG STRAIGHT CONVEYOR | VERTICAL: a, HORIZONTAL: b, HEIGHT: c, | A→B, B→A | 10021-10030 |
| BRANCH CONVEYOR | VERTICAL: a, HORIZONTAL: b, HEIGHT: c, | A→B, B→A A→C, C→A, ... | 10031-10040 |
| ROBOT | VERTICAL: f, HORIZONTAL: g, HEIGHT: h, | CONVEYANCE PATTERN A | 10041-10050 |

FIG. 5

| FIRST CONVEYANCE MODULE ID | FIRST CONVEYANCE MODULE CONNECTION DIRECTION | SECOND CONVEYANCE MODULE ID | SECOND CONVEYANCE MODULE CONNECTION DIRECTION |
|---|---|---|---|
| 10016 | B | 10031 | C |

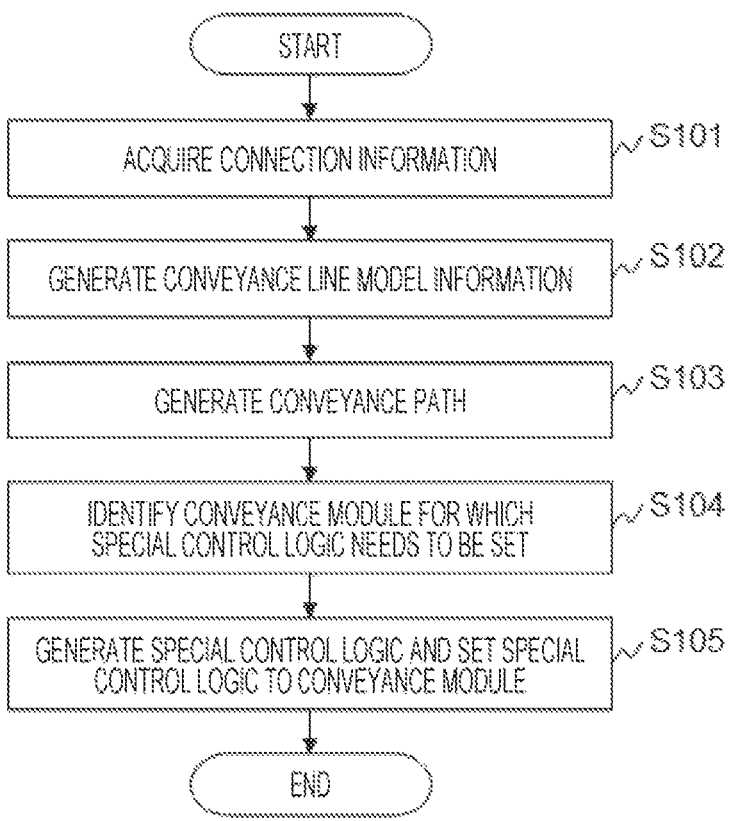

START

ACQUIRE CONNECTION INFORMATION — S101

GENERATE CONVEYANCE LINE MODEL INFORMATION — S102

GENERATE CONVEYANCE PATH — S103

IDENTIFY CONVEYANCE MODULE FOR WHICH SPECIAL CONTROL LOGIC NEEDS TO BE SET — S104

GENERATE SPECIAL CONTROL LOGIC AND SET SPECIAL CONTROL LOGIC TO CONVEYANCE MODULE — S105

END

PICKING SYSTEM

INCORPORATION BY REFERENCE

This application claims priority to Japanese Patent Application No. 2021-21427 filed on Feb. 15, 2021, the contents of which are incorporated herein by reference.

TECHNICAL FIELD

The present invention relates to a picking system for performing work of loading and unloading a product.

BACKGROUND ART

In a picking system, an article (product) is conveyed using a conveyance line to which a device such as a roller conveyor is connected. As a technique related to a picking system, a technique described in PTL 1 is known.

PTL 1 describes "a picking system that takes out an order quantity of ordered products from a storage area where products are stocked for each type and stores the taken-out ordered products in a transport container. This system includes a conveyor that conveys the transport container from an upstream storage area to a downstream storage area, a robot that takes out a part of ordered products specified in order information from the upstream storage area and puts the taken-out ordered products into the transport container, a display that is provided in the downstream storage area and notifies a worker of how many and which products in the storage area are to be taken out, and a control unit that causes the display to display an order quantity of remaining ordered products among the ordered products specified in the order information used for taking out by the robot when the transport container is conveyed from the upstream storage area to the downstream storage area".

CITATION LIST

Patent Literature

PTL 1: JP 2020-172402 A

SUMMARY OF INVENTION

Technical Problem

In a picking system of a conventional technique, work such as taking out a product is manually performed. From the viewpoint of manpower shortage, continuity of work, and the like, a picking system in which all pieces of work are automated is desired. Further, improved efficiency of picking work is required in a picking system.

An object of the present invention is to realize a picking system that is automated and enables efficient picking work.

Solution to Problem

A representative example of an invention disclosed in the present application is as described below. That is, it is a picking system for loading and unloading a product, the picking system including a plurality of conveyance modules including a conveying means for conveying a product, and a plurality of conveyance lines including at least one of the conveyance modules. A plurality of the conveyance lines include at least one first conveyance line that conveys the product along a conveyance path, at least one second conveyance line that temporarily accumulates the product, and at least one third conveyance line that conveys a shipping container of the product according to a conveyance path, a plurality of the conveyance modules include a conveyance module for picking that takes out the product conveyed from the at least one first conveyance line, and the conveyance module for picking is capable of executing first work of accommodating the product conveyed from the at least one first conveyance line in the shipping container, second work of placing the product conveyed from the at least one first conveyance line in the second conveyance line, and third work of taking out the product from the second conveyance line and accommodating the product in the shipping container.

Advantageous Effects of Invention

According to the present invention, it is possible to realize a picking system that is automated and enables efficient picking work. An object, a configuration, and an advantageous effect other than those described above will be clarified in description of an embodiment described below.

BRIEF DESCRIPTION OF DRAWINGS

FIG. 5 is a diagram illustrating an example of a data structure of connection information according to the first embodiment.

FIG. 6 is a flowchart for explaining an example of processing executed by an integrated control computer of the first embodiment.

DESCRIPTION OF EMBODIMENTS

Figure 1:
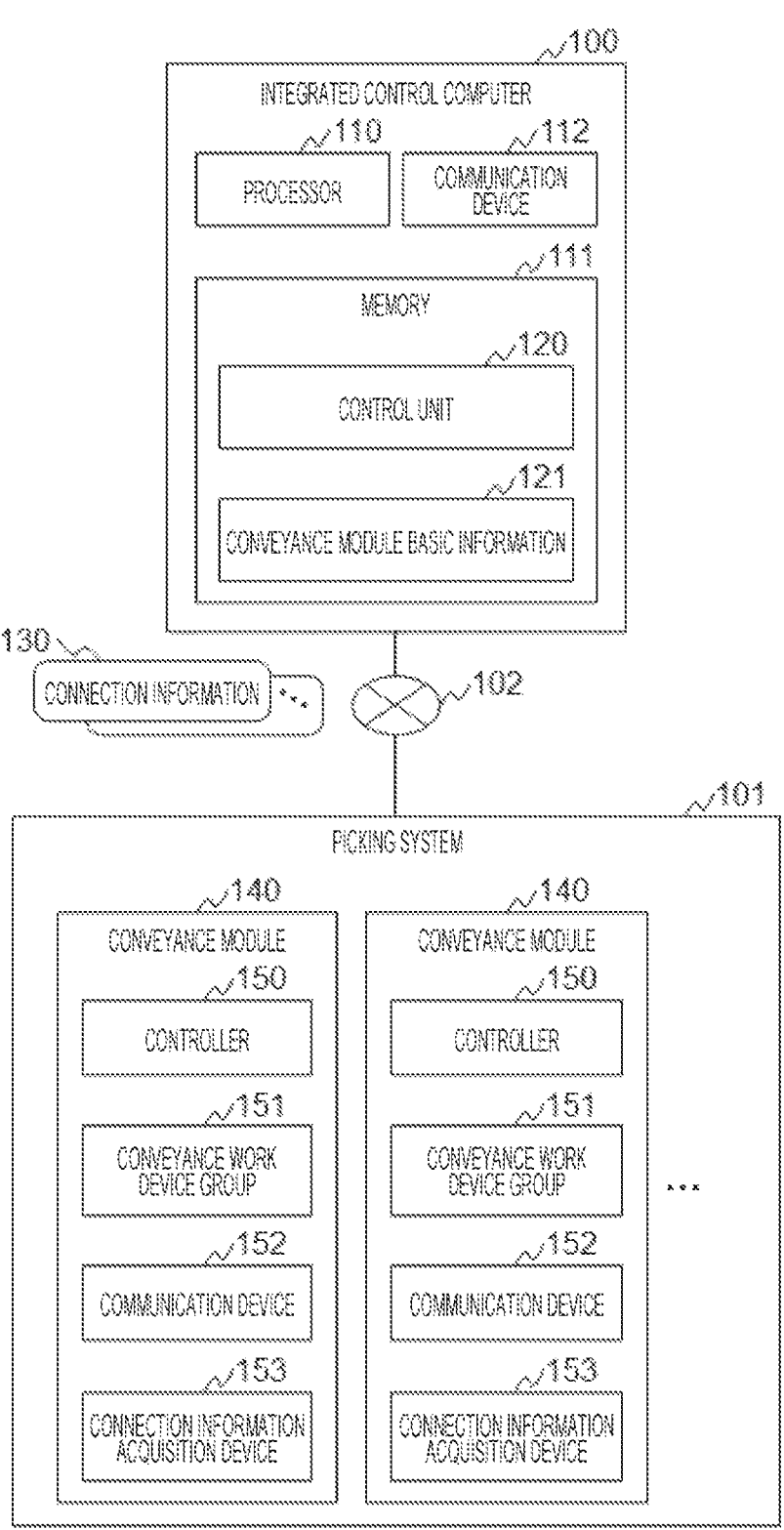
FIG. 1 is a diagram illustrating a configuration example of a system according to a first embodiment.

Hereinafter, an embodiment of the present invention will be described with reference to the drawings. However, the present invention should not be construed as being limited to the description of the embodiment below. As easily understood by those skilled in the art, a specific configuration of the present invention can be changed without departing from the idea or the spirit of the present invention.

In configurations of the invention described below, the same or similar configurations or functions are denoted by the same reference numerals, and redundant description is omitted.

Notations such as "first", "second", and "third" in the present description and the like are added to identify constituent elements, and do not necessarily limit the number or order of the constituent elements.

There is a case where a position, size, shape, range, and the like of each configuration illustrated in the drawings and the like do not represent an actual position, size, shape, range, and the like, in order to facilitate understanding of the invention. Therefore, the present invention is not limited to the position, size, shape, range, and the like disclosed in the drawings and the like.

In first and second embodiments, construction and management of a conveyance line in a picking system will be described. In a third embodiment, a configuration and control of the conveyance line that realize efficient picking work will be described. Note that the picking work represents a series of pieces of work up to collection of a product that is ordered.

First Embodiment

FIG. 1 is a diagram illustrating a configuration example of a system of the first embodiment.

The system includes an integrated control computer 100 and a picking system 101. The integrated control computer 100 and the picking system 101 are connected to each other via a network 102. The network 102 is a wide area network (WAN), a local area network (LAN), or the like, and a connection system may be either wired or wireless.

The picking system 101 includes a plurality of conveyance modules 140. The picking system 101 includes a plurality of types of the conveyance modules 140 having different conveyance means, shapes, and the like. Note that the picking system 101 may include an edge device or the like. Further, the integrated control computer 100 may be included in the picking system 101.

In the picking system 101, a conveyance line is constructed using the conveyance module 140. A product is conveyed from a start point to a goal point according to a conveyance path on the conveyance line. Here, the conveyance path represents conveyance order (conveyance plan) of a product on the conveyance line.

The conveyance module 140 is a device that performs conveyance work of a product, and includes a controller 150, a conveyance work device group 151, a communication device 152, and a connection information acquisition device 153.

The controller 150 is a device that controls the entire conveyance module 140, and includes a processor and a memory. The memory stores basic control logic for realizing basic operation of the conveyance work device group 151.

The conveyance module 140 automatically conveys a product based on the basic control logic after a conveyance line is constructed. In a case where special control logic is set from the integrated control computer 100, the conveyance module 140 conveys a product according to the special control logic.

As described above, the conveyance module 140 of the present embodiment can operate autonomously based on the basic control logic. Therefore, the integrated control computer 100 does not need to set control logic (special control logic) for all the conveyance modules 140 constituting a conveyance line. Therefore, there is an advantage that calculation cost required for setting a conveyance line can be reduced. Further, there is an advantage that a communication amount for setting control logic can be reduced.

The conveyance work device group 151 is a device group for performing conveyance work. The conveyance work device group 151 is, for example, a roller, a belt, a sensor, a motor, a lift, an arm, a tire, and the like. The present invention is not limited to devices included in the conveyance work device group 151.

The communication device 152 is a device for communicating with another device.

The connection information acquisition device 153 is a device for acquiring connection information 130. Here, the connection information 130 is information on connection between the conveyance modules 140 constituting a conveyance line. A specific data structure of the connection information 130 will be described with reference to FIG. 5.

The conveyance module 140 of the first embodiment uses the connection information acquisition device 153 to acquire the connection information 130 on connection between the self-conveyance module 140 and the another conveyance module 140. Further, the conveyance module 140 transmits the connection information 130 to the integrated control computer 100 by using the communication device 152.

Note that a device included in the conveyance work device group 151 may function as the connection information acquisition device 153.

The integrated control computer 100 is a computer that controls the picking system 101, and includes a processor 110, a memory 111, and a communication device 112. Note that the integrated control computer 100 may have a storage device such as a hard disk drive (HDD) or a solid state drive (SSD), may have an input device such as a keyboard, a mouse, or a touch panel, or may have an output device such as a display.

The processor 110 executes a program stored in the memory 111. The processor 110 executes processing according to a program to operate as a functional unit that realizes a specific function. In description below, in a case where processing is described using a functional unit as a subject, it indicates that the processor 110 executes a program that realizes the functional unit. The memory 111 stores a program executed by the processor 110 and information used by the program. Further, the memory 111 is also used as a work area. The communication device 112 is a device for communicating with another device.

The memory 111 of the first embodiment stores a program for realizing a control unit 120 and conveyance module basic information 121.

The control unit 120 performs various types of control such as generation of conveyance line model information for managing a structure of a conveyance line, generation of a conveyance path, and setting of control logic. Further, after operation of a conveyance line, the control unit 120 outputs a control instruction for controlling the conveyance line based on an order state of a product, an operation state of a conveyance line, and the like.

The conveyance module basic information 121 is information for managing a structure and the like of various types of the conveyance modules 140. A specific data structure of the conveyance module basic information 121 will be described with reference to FIG. 4.

Note that a system that realizes a function of the integrated control computer 100 may be configured by using a plurality of computers.

Figure 2A:
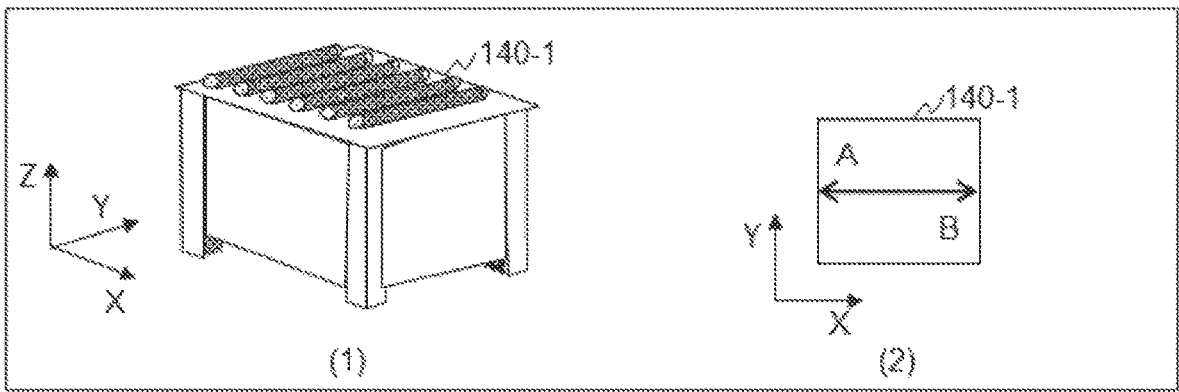
FIG. 2A is a diagram illustrating an example of a conveyance module according to the first embodiment.
Figure 2B:
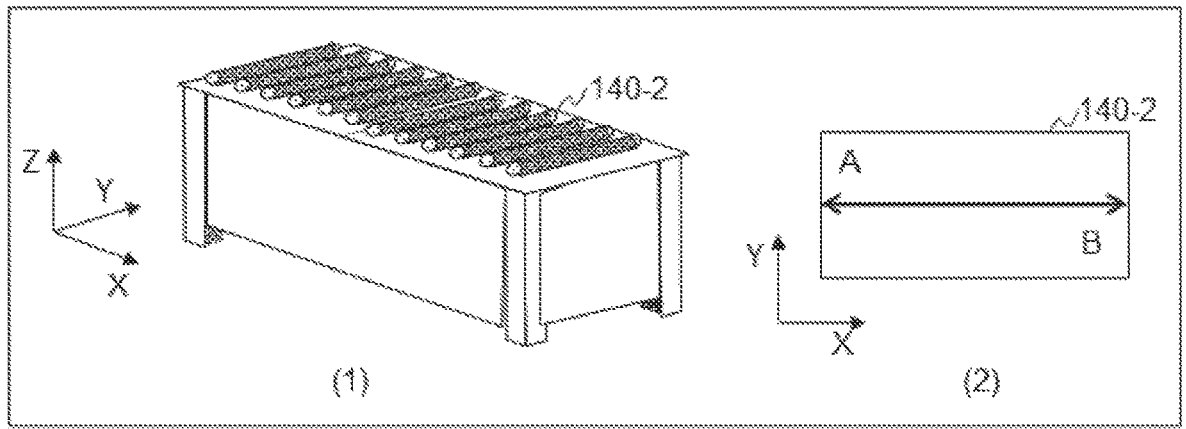
FIG. 2B is a diagram illustrating an example of the conveyance module according to the first embodiment.
Figure 2C:
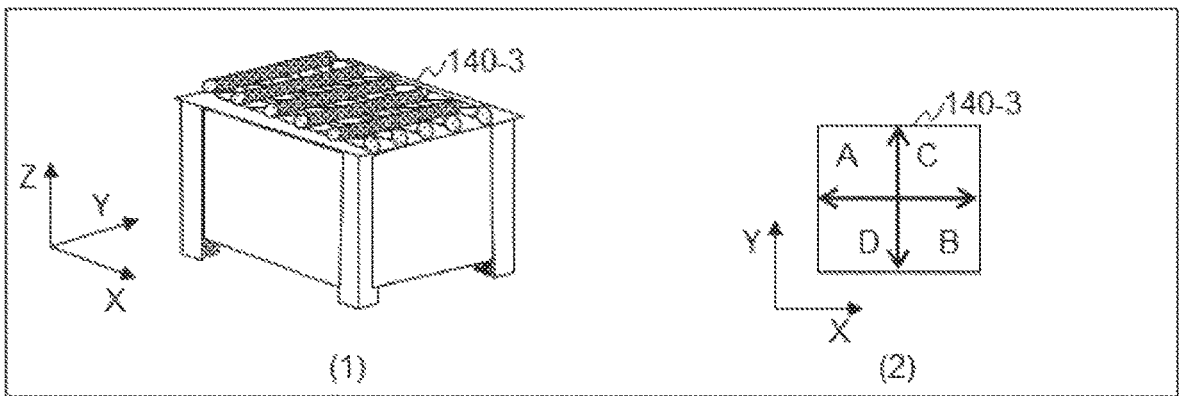
FIG. 2C is a diagram illustrating an example of the conveyance module according to the first embodiment.

FIGS. 2A, 2B, and 2C are diagrams illustrating an example of the conveyance module 140 of the first embodiment.

A conveyance module 140-1 illustrated in FIG. 2A is a short straight conveyor. FIG. 2A (1) is a perspective view of the conveyance module 140-1, and FIG. 2A (2) is a top view of the conveyance module 140-1. Note that an axis illustrated in the perspective view and the top view is provided for explanation.

The conveyance module 140-1 includes a conveying means for conveying a product from one of the two directions (Direction A and Direction B) to one of two directions. Note that Direction A and Direction B are uniquely determined with respect to the conveyance module 140-1.

A conveyance module 140-2 illustrated in FIG. 2B is a long straight conveyor. FIG. 2B (1) is a perspective view of the conveyance module 140-2, and FIG. 2B (2) is a top view of the conveyance module 140-2. Note that an axis illustrated in the perspective view and the top view is provided for explanation.

The conveyance module 140-2 includes a conveying means for conveying a product from one of the two directions (Direction A and Direction B) to one of two directions. Note that Direction A and Direction B are uniquely determined with respect to the conveyance module 140-2.

A conveyance module 140-3 illustrated in FIG. 2C is a branch conveyor. FIG. 2C (1) is a perspective view of the conveyance module 140-3, and FIG. 2C (2) is a top view of the conveyance module 140-3. Note that an axis illustrated in the perspective view and the top view is provided for explanation.

The conveyance module 140-3 includes a conveying means for conveying a product from one of four directions (Direction A, Direction B, Direction C, and Direction D) to one of the four directions. Note that Direction A, Direction B, Direction C, and Direction D are uniquely determined with respect to the conveyance module 140-3.

Note that the conveyance module 140 illustrated in FIGS. 2A, 2B, and 2C is an example, and the present invention is not limited to this. The conveyance module 140 also includes a conveyor (level changer) that conveys a product vertically, a picking robot that grips a product, and the like.

Figure 3A:
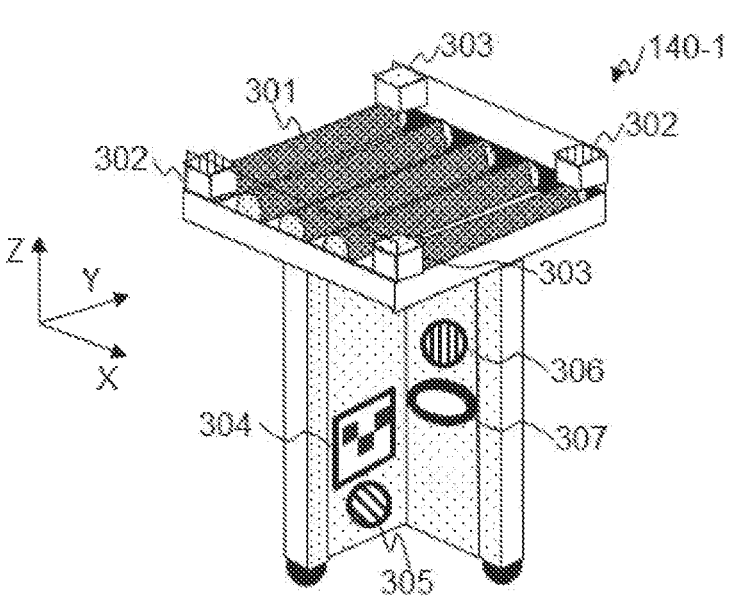
FIG. 3A is a diagram illustrating a specific structure of the conveyance module according to the first embodiment.
Figure 3B:
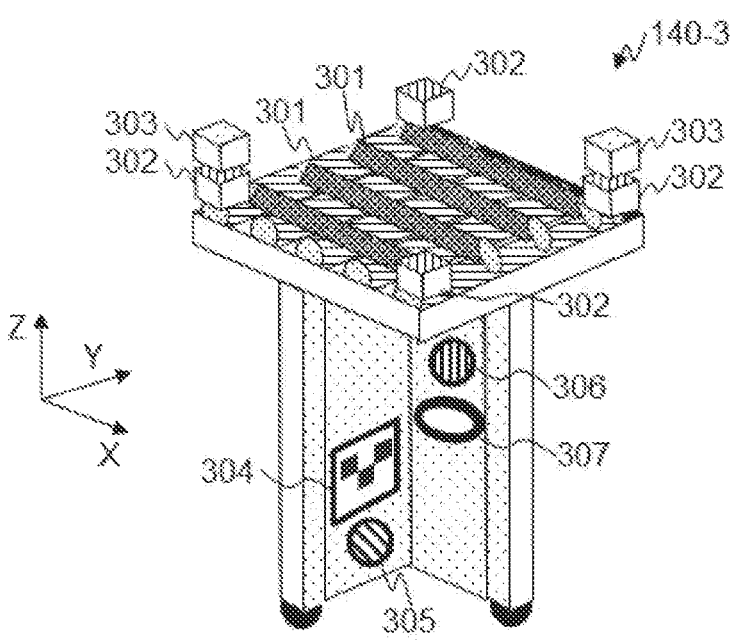
FIG. 3B is a diagram illustrating a specific structure of the conveyance module according to the first embodiment.
Figures 3C, 4:
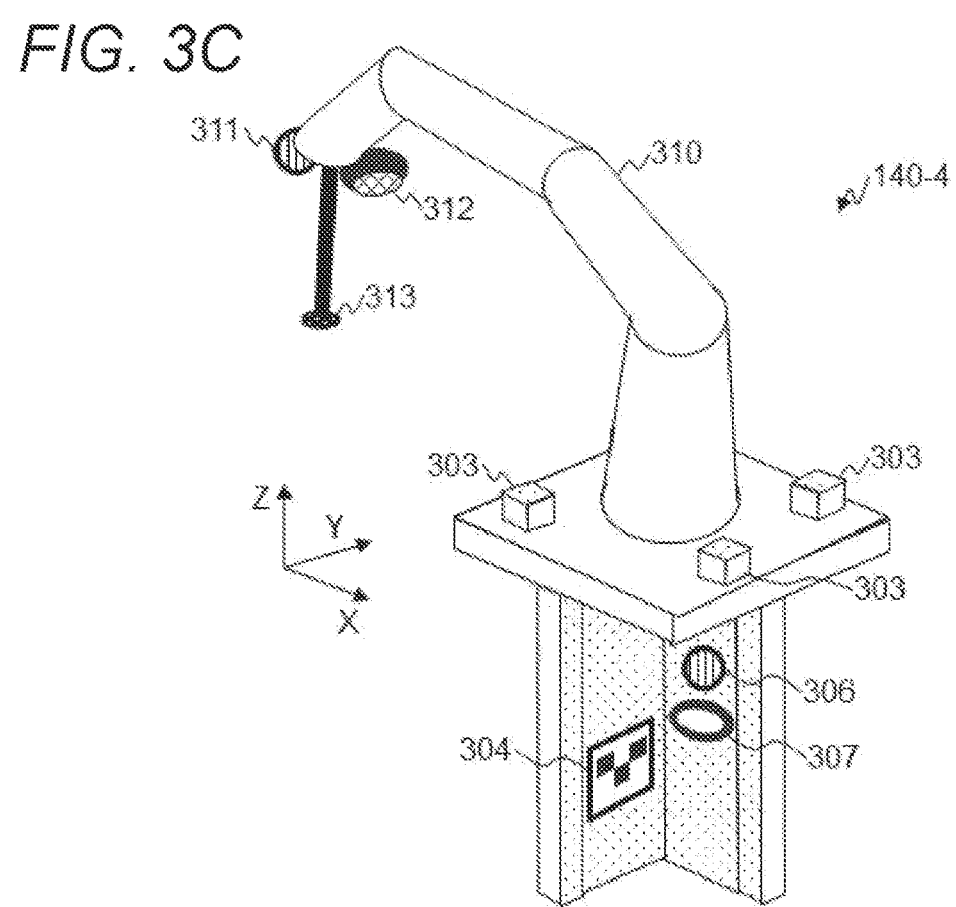
FIG. 3C is a diagram illustrating a specific structure of the conveyance module according to the first embodiment.
FIG. 4 is a diagram illustrating an example of a data structure of conveyance module basic information according to the first embodiment.

FIGS. 3A, 3B, and 3C are diagrams illustrating a specific structure of the conveyance module 140 of the first embodiment.

FIG. 3A is a perspective view illustrating a specific structure of the conveyance module 140-1 (short straight conveyor). Note that an axis illustrated in the perspective view is provided for explanation.

The conveyance module 140-1 includes a roller 301, a stock sensor 302, a barcode reader 303, an ID marker 304, a stock display LED 305, a light 306, and a camera 307.

The roller 301 conveys a product by rotating in a certain direction. A product may be stored in a container and conveyed. In this case, two or more products may be stored in one container.

The stock sensor 302 measures the presence or absence of a product on the conveyance module 140-1. The stock display LED 305 outputs a signal indicating the presence or absence of a product on the conveyance module 140-1 based on a measurement result of the stock sensor 302. For example, in a case where a product exists on the conveyance module 140-1, the stock display LED 305 is turned on, and in a case where no product exists on the conveyance module 140-1, the stock display LED 305 is turned off.

The barcode reader 303 reads a barcode attached to a product or a container. A barcode is attached for identification of a conveyance destination, a type of a product, and the like.

The ID marker 304 is a marker that indicates identification information and a direction of the conveyance module 140. In the conveyance module 140-1, the ID marker 304 is attached in each of Direction A and Direction B.

The light 306 is used for the camera 307 to acquire a clear image. The camera 307 reads a signal of the ID marker 304 and the stock display LED 305 of another one of the conveyance modules 140.

The roller 301, the stock sensor 302, the barcode reader 303, the stock display LED 305, and the camera 307 are examples of the conveyance work device group 151. The camera 307 is an example of the connection information acquisition device 153.

In the conveyance module 140-1, for example, basic control logic as described below is set. The conveyance module 140-1 receives a product conveyed from an optional direction in a case where no product exists in the conveyance module 140-1 itself, and, in a case where the stock display LED 305 for the connected conveyance module 140 is turned off, conveys a product to the connected conveyance module 140.

FIG. 3B is a perspective view illustrating a specific structure of the conveyance module 140-3 (branch conveyor). Note that an axis illustrated in the perspective view is provided for explanation.

The conveyance module 140-3 includes the roller 301, the stock sensor 302, the barcode reader 303, the ID marker 304, the stock display LED 305, the light 306, and the camera 307.

The conveyance module 140-3 includes the rollers 301 whose rotation directions are different. Further, the conveyance module 140-3 is attached with the ID marker 304 for each of Direction A, Direction B, Direction C, and Direction D, and includes the light 306 and the camera 307 in each of the four directions. Other configurations are the same as those of the conveyance module 140-1.

In the conveyance module 140-3, for example, basic control logic as described below is set. The conveyance module 140-3 receives a product conveyed from an optional direction in a case where no product exists in the self-conveyance module 140-3, and, in a case where the stock display LED 305 for the connected conveyance module 140 is turned off, conveys a product to the connected conveyance module 140.

FIG. 3C is a perspective view illustrating a specific structure of a conveyance module 140-4 (picking robot). The conveyance module 140-4 is a robot that performs product gripping work. Note that an axis illustrated in the perspective view is provided for explanation.

The conveyance module 140-4 includes the barcode reader 303, the ID marker 304, the light 306, the camera 307, a hand 310, a light 311, an RGBD camera 312, and a sucker 313.

The hand 310 moves in various directions to perform gripping work. The light 311 is used for the RGBD camera 312 to acquire a clear image. The RGBD camera 312 identifies a product on another adjacent one of the conveyance modules 140. The sucker 313 grips a product.

The conveyance module 140-4 is provided with the ID marker 304 in each of four directions, and has the stock display LED 305, the light 306, and the camera 307 in each of the directions. Other configurations are the same as those of the conveyance module 140-1.

In the conveyance module 140-4, for example, basic control logic as described below is set. In a case where the stock display LED 305 of a connected one of the conveyance modules 140 is turned on, the conveyance module 140-4 moves the hand 310 to grip a product.

In the first embodiment, the conveyance module 140 acquires connection information by photographing the ID marker 304 by using the camera 307.

However, the method of acquiring connection information by the conveyance module 140 is an example, and the present invention is not limited to this. For example, an ID and the like may be notified between the conveyance modules 140 by using infrared communication. Further, the conveyance module 140 may include an RFID tag and a reader, and acquire connection information by reading an RFID tag with the reader. Further, a wiring may be provided on a frame or the like of the conveyance module 140, and a connection direction may be identified by connection or short-circuiting by bringing the frames into contact with each other.

FIG. 4 is a diagram illustrating an example of a data structure of the conveyance module basic information 121 according to the first embodiment.

The conveyance module basic information 121 stores an entry including a type 401, a shape 402, conveyance control 403, and an ID range 404. One entry corresponds to one type of the conveyance module 140. Note that a field included in an entry is an example, and the present invention is not limited to this.

The type 401 is a field that stores a value indicating a type of the conveyance module 140. For example, a model number, a name, and the like of the conveyance module 140 are stored.

The shape 402 is a field for storing a value related to a shape of the conveyance module 140. For example, a value indicated by size of the conveyance module 140 or the like is stored.

The conveyance control 403 is a field for storing a value related to a basic conveyance method of a product. For example, a value indicating a conveyance direction is stored.

The ID range 404 is a field for storing a range of IDs assigned to the conveyance modules 140 of the same type.

FIG. 5 is a diagram illustrating an example of a data structure of the connection information 130 according to the first embodiment.

The connection information 130 includes a first conveyance module ID 501, a first conveyance module connection direction 502, a second conveyance module ID 503, and a second conveyance module connection direction 504.

The first conveyance module ID 501 is a field for storing an ID of the first conveyance module 140. In the first embodiment, an ID of the self-conveyance module 140 is stored in the first conveyance module ID 501. Here, the self-conveyance module 140 represents the conveyance module 140 that generates the connection information 130.

The first conveyance module connection direction 502 is a field that stores a value indicating a connection direction of the second conveyance module 140 to the first conveyance module 140. In the first embodiment, a value indicating a connection direction of the another conveyance module 140 to the self-conveyance module 140 is stored in the first conveyance module connection direction 502. Here, the another conveyance module 140 represents the conveyance module 140 connected to the self-conveyance module 140.

The second conveyance module ID 503 is a field for storing an ID of the second conveyance module 140. In the first embodiment, an ID of the another conveyance module 140 is stored in the second conveyance module ID 503.

The second conveyance module connection direction 504 is a field that stores a value indicating a connection direction of the first conveyance module 140 to the second conveyance module 140. In the first embodiment, a value indicating a connection direction of the self-conveyance module 140 to the another conveyance module 140 is stored in the second conveyance module connection direction 504.

In a case where two another conveyance modules 140 are connected to the self-conveyance module 140, the self-conveyance module 140 generates the connection information 130 for each connection and transmits the connection information 130 to the integrated control computer 100.

Figure 7:
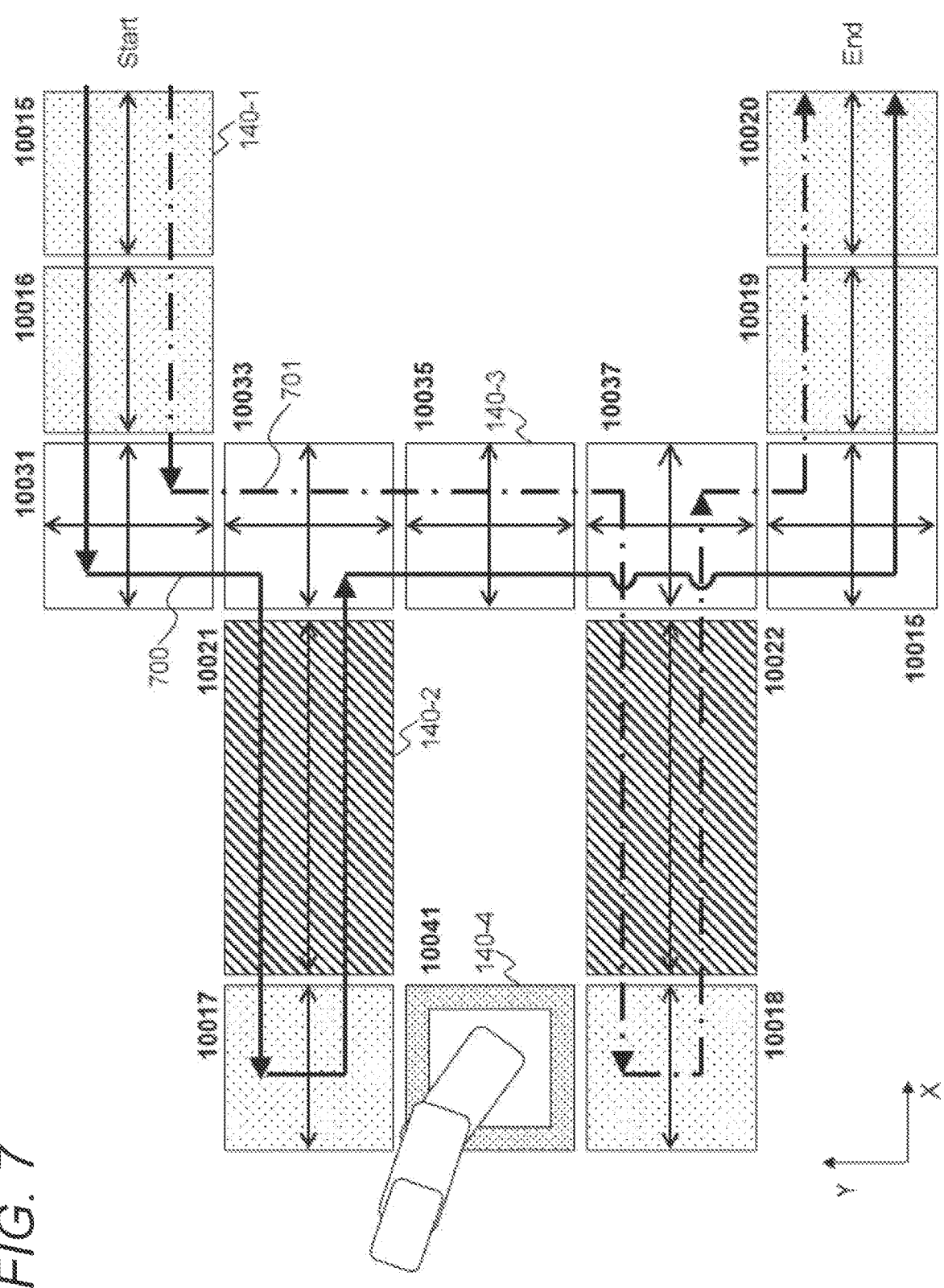
FIG. 7 is a diagram illustrating an example of a conveyance line constructed in a picking system of the first embodiment.

FIG. 6 is a flowchart illustrating an example of processing executed by the integrated control computer 100 according to the first embodiment. FIG. 7 is a diagram illustrating an example of a conveyance line constructed in the picking system 101 of the first embodiment.

The integrated control computer 100 acquires the connection information 130 from the picking system 101 (Step S101). In the first embodiment, each of the conveyance modules 140 transmits the connection information 130. The integrated control computer 100 stores the received connection information 130 in the memory 111.

Next, the integrated control computer 100 generates conveyance line model information by using the conveyance module basic information 121 and the received connection information 130 (Step S102).

The conveyance line model information is information for managing a structure of a conveyance line constructed in the picking system 101. The conveyance line model information includes, for example, data indicating a connection relationship of the conveyance modules 140 constituting a conveyance line. The integrated control computer 100 can display a diagram as illustrated in FIG. 7 based on the conveyance line model information. Note that the conveyance line model information does not need to be generated.

A numerical value of a thick letter of the conveyance module 140 in FIG. 7 indicates an ID. The conveyance paths 700 and 701 indicate conveyance paths set on a conveyance line. Here, the conveyance path 700 is a conveyance path for conveying a product of Company A, and the conveyance path 701 is a conveyance path for conveying a product of Company B.

Next, the integrated control computer 100 generates a conveyance path (conveyance plan) on a conveyance line (Step S103).

It is assumed that the integrated control computer 100 previously receives information on points such as a start point, an end point, and a relay point of a conveyance line, and information on a type and the like of a product to be conveyed by using a conveyance line. A start point, an end point, a relay point, and the like of a conveyance line are designated by using identification information and a direction of the conveyance module 140. In FIG. 7, "10015, B", "10020, A", and "10017, A" are input as a start point, an end point, and a relay point of the conveyance path 700, and "10015, B", "10020, A", and "10018, A" are input as a start point, an end point, and a relay point of the conveyance path 701.

The integrated control computer 100 generates a conveyance path connecting input points based on a publicly-known route search algorithm such as Dijkstra's algorithm. Note that the present invention is not limited to the method of searching for a conveyance path. Note that two or more conveyance paths may be generated on one conveyance line.

Next, the integrated control computer 100 identifies the conveyance module 140 for which special control logic needs to be set (Step S104).

For example, the integrated control computer 100 identifies the conveyance module 140 that meets any of conditions below.

(1) A path for stopping a product for a certain period after receiving the product and then conveying the product is set. This is because there is a need to set special control logic that stops a product for a certain period after receiving the product and conveys the product in a case where a predetermined condition is satisfied.

(2) Two or more paths with different conveyance destinations of products received from the same direction are set. This is because there is a need to set special control logic that controls which product is conveyed at which timing in which direction.

(3) The conveyance module 140-4 takes out a plurality of types of products. This is because there is a need to set special control logic that selects a product to be taken out according to an order or the like, grips the product, and moves the product to a predetermined position.

The conveyance modules 140-1 with IDs "10017" and "10018" illustrated in FIG. 7, for which a path for stopping for a certain period of time after receiving a product and conveying the product, satisfy Condition (1). The conveyance modules 140-3 with IDs "10033" and "10037", for which two paths with different conveyance destinations are set, satisfy Condition (2).

Note that the above condition is an example, and the present invention is not limited to this. Any condition may be used as long as the conveyance module 140 that is difficult to control by basic control logic can be identified.

Next, the integrated control computer 100 generates special control logic to be set to the identified conveyance module 140 and sets the special control logic to the identified conveyance module 140 (Step S105).

In a case of the conveyance path illustrated in FIG. 7, special control logic for performing control below is generated in the conveyance module 140-1 with the ID "10017".

(1) Receive a product and stop.

(2) In a case where a certain period of time elapses or a predetermined condition is satisfied, convey the product in the same direction as the received direction.

In the case of the conveyance path illustrated in FIG. 7, special control logic for performing control below is generated in the conveyance module 140-3 with the ID "10033".

(1) In a case of receiving a product of Company A from the conveyance module 140-3 with the ID "10031", convey the product to the conveyance module 140-2 with an ID "10021".

(2) In a case of receiving a product of Company B from the conveyance module 140-3 with an ID "10031", convey the product to the conveyance module 140-3 with an ID "10035".

(3) Until receiving a product from the conveyance module 140-2 with the ID "10021", do not receive the product of Company A. Receive the product of Company B.

(4) In a case of receiving a product from the conveyance module 140-2 with the ID "10021", convey the product to the conveyance module 140-3 with the ID "10035".

According to the first embodiment, the conveyance module 140 can transmit the connection information 130 indicating a connection relationship between the self-conveyance module 140 and the another conveyance module 140 to the integrated control computer 100. By the above, the integrated control computer 100 can grasp a conveyance line constructed in the picking system 101. Further, the integrated control computer 100 can automatically perform generation of conveyance line model information, generation of a conveyance path, setting of special control logic, and the like on the basis of the connection information 130 received from the picking system 101.

Second Embodiment

In the second embodiment, a carrier that autonomously travels is included as the conveyance module 140. Hereinafter, the second embodiment will be described focusing on a difference from the first embodiment.

A configuration of a system of the second embodiment is the same as the configuration of the first embodiment. A configuration of the integrated control computer 100 of the second embodiment is the same as the configuration of the first embodiment. A configuration of the picking system 101 of the second embodiment is similar to that of the first embodiment, but a carrier is included as a conveyance module 140-5. The carrier performs, for example, conveyance work as described below. Note that the picking system 101 may include a mixture of carriers that perform different conveyance work.

(1) The carrier receives a product, moves by traveling autonomously to the target conveyance module 140, and conveys the product to the target conveyance module 140.

(2) The carrier conveys a shelf that stores a container containing a product.

A data structure of the conveyance module basic information 121 in the second embodiment is the same as the data structure in the first embodiment. A data structure of the connection information 130 of the second embodiment is the same as the data structure of the first embodiment.

The conveyance modules 140-1, 140-2, 140-3, and 140-4 of the second embodiment do not include the connection information acquisition device 153. On the other hand, the carrier (conveyance module 140-5) has the connection information acquisition device 153.

A structure of the conveyance modules 140-1, 140-2, 140-3, and 140-4 of the second embodiment is the same as the structure of the first embodiment. However, in the second embodiment, the camera 307 is not used to read the ID marker 304.

Figure 8:
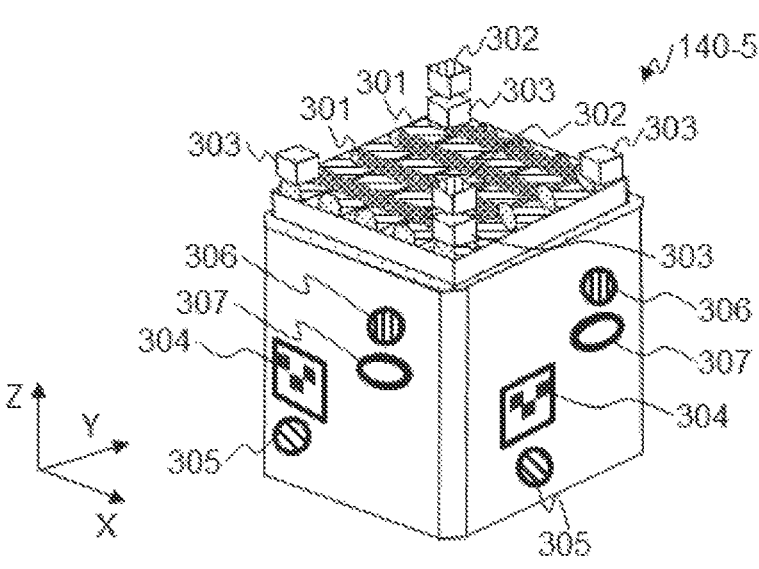
FIG. 8 is a diagram illustrating a specific structure of the conveyance module according to a second embodiment.

FIG. 8 is a diagram illustrating a specific structure of the conveyance module 140-5 of the second embodiment. FIG. 8 illustrates, as an example, a structure of the conveyance module 140-5 that conveys a product.

The conveyance module 140-5 includes the roller 301, the stock sensor 302, the barcode reader 303, the ID marker 304, the stock display LED 305, the light 306, and the camera 307. Further, the conveyance module 140-5 includes a distance sensor (not illustrated) and a tire for autonomous traveling.

The conveyance module 140-5 includes the rollers 301 whose rotation directions are different. Further, the conveyance module 140-5 is attached with the ID marker 304 for each of Direction A, Direction B, Direction C, and Direction D, and includes the stock display LED 305, the light 306 and the camera 307 in each of the four directions. Other configurations are the same as those of the conveyance module 140-1.

The controller 150 of the conveyance module 140-5 stores map information of a moving space. The conveyance module 140-5 travels in a moving space while estimating its own position on the basis of the map information and a measurement result of the distance sensor. The conveyance module 140-5 may travel randomly in the moving space, or may travel in the moving space based on a preset policy.

While traveling, the conveyance module 140-5 uses the camera 307 to read the ID marker 304 attached to the conveyance module 140 constituting a conveyance line, and generates the connection information 130. At this time, the conveyance module 140-5 determines one of the conveyance modules 140 to be connected as a first conveyance module. For example, the first conveyance module is determined according to a traveling direction. The conveyance module 140-5 transmits the connection information 130 to the integrated control computer 100.

Processing executed by the integrated control computer 100 of the second embodiment is the same as that of the first embodiment. However, in the second embodiment, a large-scale conveyance line including an independent conveyance line can be constructed by using the conveyance module 140-5. Conveyance of a product between independent conveyance lines is performed by the conveyance module 140-5.

Figure 9:
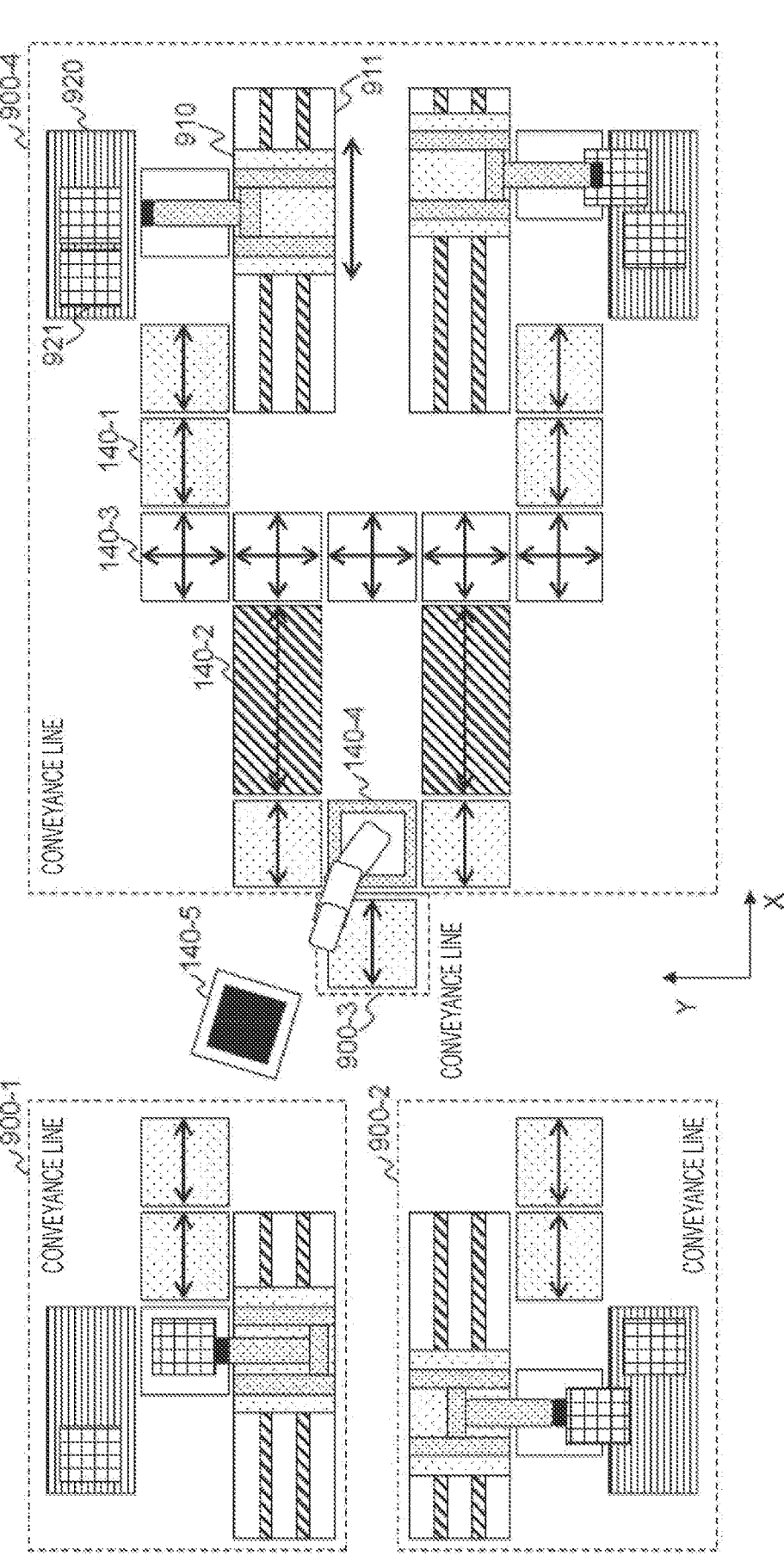
FIG. 9 is a diagram illustrating an example of a conveyance line constructed in the picking system of the second embodiment.

FIG. 9 is a diagram illustrating an example of a conveyance line constructed in the picking system 101 of the second embodiment.

FIG. 9 illustrates an example of the picking system 101 in which four conveyance lines 900-1, 900-2, 900-3, and 900-4 are constructed. Note that the conveyance line 900-3 is a conveyance line including one conveyance module 140-1.

The conveyance lines 900-1, 900-2, and 900-4 include a robot 910 that is movable along a rail of a pedestal 911. The robot 910 takes out a container 921 from a shelf 920 or accommodates the container 921 in the shelf 920. The conveyance module 140-5 conveys the container 921 between the conveyance lines 900-1, 900-2, and 900-3. The conveyance module 140-5 is not treated as the conveyance module 140 constituting a conveyance line.

The conveyance line illustrated in FIG. 9 is a conveyance line constructed to perform sorting work of products. For example, in the conveyance lines 900-1 and 900-2, the container 921 accommodating a product is taken out from the shelf 920, and the container 921 is conveyed to the conveyance line 900-3 by the conveyance module 140-5. The conveyance module 140-4 connected to the conveyance module 140-1 of the conveyance line 900-3 distributes the containers 921 to a conveyance path set in the conveyance line, and the robot 910 grips the container 921 that arrives at an end point of the conveyance path and accommodates the container 921 in the shelf 920. The shelf 920 may be conveyed by the conveyance module 140-5.

Note that control logic is set to the robot 910 in advance. Further, special control logic is set to the conveyance module 140-5.

According to the second embodiment, the conveyance module 140-5 can acquire the connection information 130 by traveling in a moving space of the picking system 101 and transmit the connection information 130 to the integrated control computer 100. By the above, the integrated control computer 100 can grasp a conveyance line constructed in the picking system 101. Further, the integrated control computer 100 can automatically perform generation of conveyance line model information, generation of a conveyance path, setting of special control logic, and the like on the basis of the connection information 130 received from the picking system 101.

Third Embodiment

In the third embodiment, a configuration and control of a conveyance line of the picking system 101 for realizing automated and efficient picking work will be described.

In picking work, work of taking out a container from a shelf in which the container for accommodation is accommodated, taking out a product from a container, and further accommodating a product in a container for shipment is performed.

The picking system 101 in which all pieces of work of picking work are automated is constructed by combining the conveyance module 140 and a robot that perform each piece of the work exclusively.

In order to control the automated picking system 101, control based on a control plan considering an operation state, an order state of a product, and the like is required in addition to basic control logic. However, since an operation state and an order state of a product change from moment to moment, it is difficult to create a control plan of picking work in advance. Therefore, at a certain time, it is necessary to design an optimal control plan in real time so as to achieve a certain purpose, and control a conveyance line according to the control plan.

Further, if a configuration of a conveyance line of the picking system 101 is not taken into consideration, in a case where the conveyance line is controlled according to a control plan, stagnation of a product or a container occurs in a certain conveyance line due to a difference in conveyance functions of the conveyance modules 140 or the like. Stagnation of a product or a container in a conveyance line affects work of another conveyance line. Therefore, a configuration of a conveyance line that realizes efficient picking work is also important.

Figure 10:
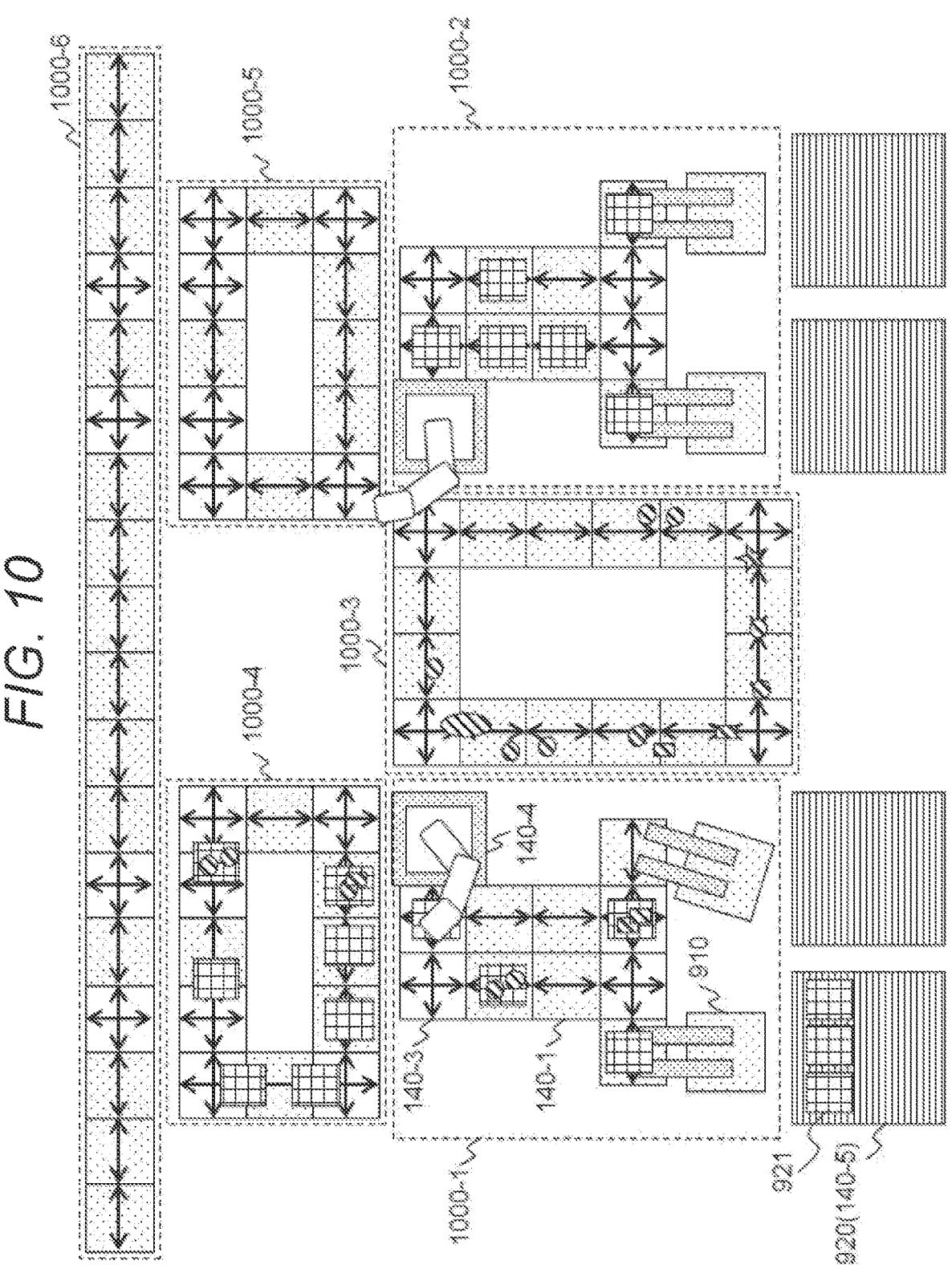
FIG. 10 is a diagram illustrating an example of a conveyance line constructed in the picking system of a third embodiment.

FIG. 10 is a diagram illustrating an example of a conveyance line constructed in the picking system 101 of the third embodiment.

In the picking system 101 illustrated in FIG. 10, six conveyance lines 1000-1, 1000-2, 1000-3, 1000-4, 1000-5, and 1000-6 are constructed.

The conveyance lines 1000-1 and 1000-2 are conveyance lines for conveying the container 921 containing a product, and include the robot 910 and the conveyance modules 140-1, 140-3, and 140-4. The conveyance module 140-4 may be included in another conveyance line 1000. Note that by setting a conveyance path circulating in the conveyance lines 1000-1 and 1000-2, the conveyance lines can function as a buffer that temporarily accumulates the container 921.

The robot 910 performs work of taking out the container 921 from the shelf 920 and work of accommodating the container 921 in the shelf 920. The shelf 920 may be conveyed from a warehouse or the like that accommodates the shelf 920 by the conveyance module 140-5. The conveyance modules 140-1 and 140-3 constituting the conveyance lines 1000-1 and 1000-2 perform work of conveying the container 921 to the vicinity of the conveyance module 140-4 and work of conveying the container 921 to the vicinity of the robot 910 according to a conveyance path.

The conveyance module 140-4 connected to the conveyance module 140-3 constituting the conveyance line 1000-1 performs work of taking out a product from the container 921 and accommodating the product in the container 921 for shipment on the conveyance line 1000-4, work of taking out a product from the container 921 and placing the product on the conveyance line 1000-3, and work of taking out a product from the conveyance line 1000-3 and accommodating the product in the container 921 for shipment on the conveyance line 1000-4. The conveyance module 140-4 connected to the conveyance module 140-3 constituting the conveyance line 1000-2 performs similar operation.

The conveyance module 140-4 connected to the conveyance module 140-3 constituting the conveyance line 1000-1 can move a product taken out from the container 921 to either the conveyance line 1000-4 or the conveyance line 1000-3, so that stagnation of the container 921 of the conveyance line 1000-1 can be prevented. Operation of the conveyance module 140-4 connected to the conveyance module 140-3 constituting the conveyance line 1000-2 has a similar effect. By the above, efficient picking work can be realized as the entire system.

To the robot 910, special control logic for performing taking-out work and accommodating work of the container 921 based on a control instruction from the outside is set. Further, to the conveyance module 140-5, special control logic for distributing products to the conveyance lines 1000-3 and 1000-4 based on a control instruction from the outside is set. The control instruction is output from the integrated control computer 100.

The conveyance line 1000-3 is a conveyance line that functions as a buffer that temporarily accumulates products, and includes conveyance modules 140-1 and 140-3. A circulating conveyance path is set to the conveyance line 1000-3. The conveyance line 1000-3 is used by both of two of the conveyance lines 1000-1 and 1000-2.

The conveyance lines 1000-4 and 1000-5 are conveyance lines for conveying the container 921 for shipment, and include the conveyance modules 140-1 and 140-3. The conveyance lines 1000-4 and 1000-5 and the conveyance line 1000-6 are connected directly or via a rail or the like. Note that a product or a container may be conveyed between the conveyance lines 1000-4 and 1000-5 and the conveyance line 1000-6 using the conveyance module 140-5.

To the conveyance module 140-3 constituting the conveyance lines 1000-4 and 1000-5 and connected to the conveyance line 1000-6, special control logic for conveying the container 921 for shipment to the conveyance line 1000-6 is set in order to ship a product based on a control instruction. Further, to the conveyance module 140-3, special control logic for conveying the container 921 to the conveyance line 1000-5 via the conveyance line 1000-6 on the basis of a control instruction, and special control logic for receiving the container 921 from the conveyance line 1000-5 on the basis of a control instruction are set. Similar special control logic is also set to the conveyance module 140-3 constituting the conveyance line 1000-5 and connected to the conveyance line 1000-6.

Note that the containers 921 conveyed through the conveyance lines 1000-4 and 1000-5 may stagnate on the conveyance lines 1000-4 and 1000-5 until all necessary products are accommodated. That is, the conveyance lines 1000-4 and 1000-5 can function as a buffer that temporarily accommodates the containers 921.

The conveyance line 1000-6 is a conveyance line for conveying the container 921 for shipment to a transporting means such as a truck, and includes the conveyance modules 140-1 and 140-3.

Figure 11:
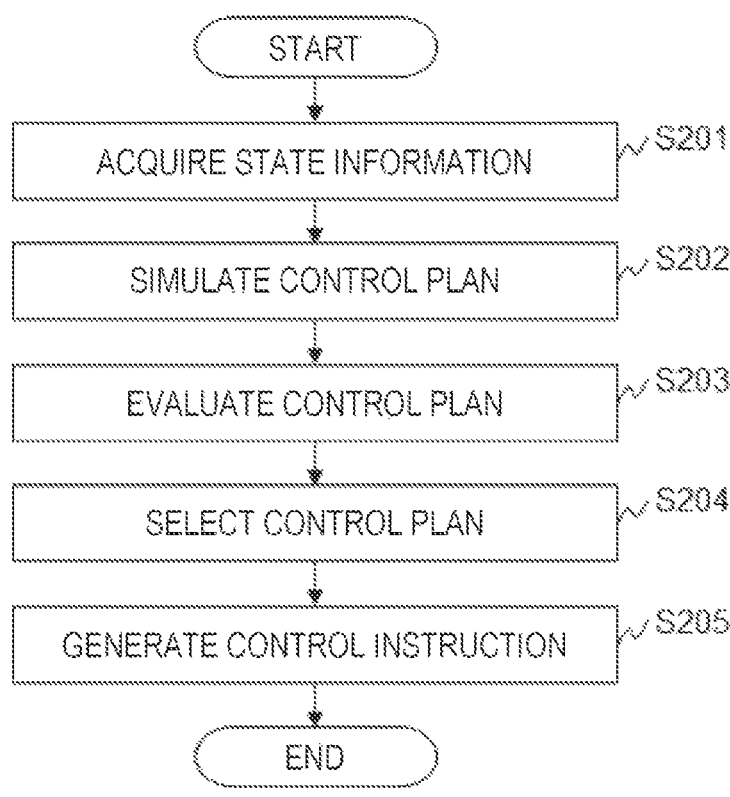
FIG. 11 is a flowchart for explaining an example of processing executed by the integrated control computer of the third embodiment.

Next, a method of generating a control instruction will be described. Here, it is assumed that the integrated control computer 100 generates a control instruction. FIG. 11 is a flowchart for explaining an example of processing executed by the integrated control computer 100 according to the third embodiment.

The integrated control computer 100 acquires operation state information from the conveyance module 140 constituting a conveyance line (Step S201). The operation state information includes information on the container 921, a product, and the like conveyed in a conveyance line, and information on a control state of the conveyance module 140 and the like.

The integrated control computer 100 simulates a control plan in a conveyance line based on the operation state information, order information of a product, and the like (Step S202).

For simulation of a control plan, a method using an optional simulator, a model generated by machine learning, or the like is conceivable. Note that, for the simulation, a prediction result of an operation state of a conveyance line or the like may be used.

The integrated control computer 100 evaluates a control plan on the basis of a result of the simulation (Step S203). Specifically, the integrated control computer 100 determines whether or not a product can be normally loaded and unloaded, and calculates an index indicating work efficiency. The index indicating work efficiency is, for example, work time.

On the basis of an evaluation result, the integrated control computer 100 selects a control plan that enables normal loading and unloading of a product and provides most excellent work efficiency (Step S204).

The integrated control computer 100 generates a control instruction based on the selected control plan (Step S205). The integrated control computer 100 may transmit a control instruction together with an execution condition to the conveyance module 140 in advance. Further, the integrated control computer 100 may monitor whether or not an execution condition is satisfied, and transmit a control instruction to the conveyance module 140 in a case where the execution condition is satisfied.

According to the third embodiment, it is possible to realize the picking system 101 in which picking work is automated. Further, by providing a conveyance path functioning as a buffer, efficiency of picking work can be improved.

Note that the present invention is not limited to the above embodiment and includes a variety of variations. Further, for example, configurations of the above embodiment are described in detail for easy understanding of the present invention, and the present invention is not necessarily limited to one that includes all of the described configurations. Further, for a part of a configuration of each embodiment, other configurations can be added, removed, or replaced with.

Further, a part or the whole of the above configurations, functions, processing units, processing means, and the like may be obtained as hardware by way of, for example, designing them as an integrated circuit. Further, the present invention can also be realized by a program code of software that realizes a function of the embodiment. In this case, a storage medium in which the program code is recorded is provided to a computer, and a processor included in the computer reads the program code stored in the storage medium. In this case, the program code itself read from the storage medium realizes the functions of the embodiment described above, and the program code itself and the storage medium storing the program code constitute the present invention. As a storage medium for supplying such a program code, for example, a flexible disk, a CD-ROM, a DVD-ROM, a hard disk, a solid state drive (SSD), an optical disk, a magneto-optical disk, a CD-R, a magnetic tape, a non-volatile memory card, a ROM, or the like is used.

Further, a program code for realizing a function described in the present embodiment can be implemented by a wide range of programs or script languages such as assembler, C/C++, perl, Shell, PHP, Python, and Java.

Furthermore, a program code of software that realizes a function of the embodiments may be distributed via a network to be stored in a storage means such as a hard disk or a memory of a computer or a storage medium such as a CD-RW or a CD-R, and a processor included in the computer may read and execute the program code stored in the storage means or the storage medium.

The above embodiment shows a control line and an information line that are considered necessary for explanation, and does not always show all control lines or information lines on a product. All configurations may be connected to each other.

The invention claimed is:

1. A picking system for loading and unloading a product, the picking system comprising:
  a plurality of conveyance modules including a conveying means for conveying a product; and
  a plurality of conveyance lines including at least one of the conveyance modules,
  wherein the plurality of conveyance lines include:
  at least one first conveyance line that conveys the product along a conveyance path;
  at least one second conveyance line that temporarily accumulates the product; and
  at least one third conveyance line that conveys a shipping container of the product according to a conveyance path,
  wherein the plurality of conveyance modules include a conveyance module for picking that takes out the product conveyed from the at least one first conveyance line, and
  wherein the conveyance module for picking is capable of executing first work of accommodating the product conveyed from the at least one first conveyance line in the shipping container, second work of placing the product conveyed from the at least one first conveyance line in the second conveyance line, and third work of taking out the product from the second conveyance line and accommodating the product in the shipping container,
  wherein the plurality of conveyance lines include:
  a plurality of the third conveyance lines; and
  at least one fourth conveyance line that conveys the shipping container to a transporting means, and
  wherein the at least one conveyance module constituting the third conveyance line is capable of executing at least one of operation of conveying the shipping container to another one of the third conveyance lines via the at least one fourth conveyance line and operation of receiving the shipping container from another one of the third conveyance lines via the at least one fourth conveyance line.

2. The picking system according to claim 1, further comprising:
  a control unit that generates a control instruction for causing the conveyance module for picking to execute any of the first work, the second work, and the third work.

3. The picking system according to claim 1,
  wherein the plurality of conveyance lines include a plurality of the first conveyance lines, and
  the at least one second conveyance line accumulates the product conveyed from each of the plurality of first conveyance lines.

4. The picking system according to claim 1,
  wherein the at least one second conveyance line is a conveyance line to which a circulating conveyance path is allowed to be set.

5. The picking system according to claim 1,
  wherein connection is made to a control system that controls the plurality of conveyance modules, and
  connection information on connection between the conveyance modules of each of the plurality of conveyance modules constituting the conveyance line is transmitted to the control system.

6. The picking system according to claim 5,
  wherein the connection information includes identification information of a first conveyance module, identification information of a second conveyance module connected to the first conveyance module, a connection direction of the second conveyance module to the first conveyance module, and a connection direction of the first conveyance module to the second conveyance module.

7. The picking system according to claim 6,
  wherein each of the plurality of conveyance modules includes an acquiring means for acquiring the connection information,
  the acquiring means is used to acquire the connection information in which the first conveyance module is set to a self-conveyance module, and
  the connection information is transmitted to the control system.

8. The picking system according to claim 6,
  wherein the plurality of conveyance modules include a moving conveyance module capable of autonomously traveling between the conveyance modules constituting the conveyance line in order to convey the product, and
  wherein the moving conveyance module;
  includes an acquiring means for acquiring the connection information,
  travels a space in which the plurality of conveyance module are arranged, acquires the connection information of each of the plurality of conveyance modules by using the acquiring means, and
  transmits the connection information of each of the plurality of conveyance modules to the control system.

* * * * *